United States Patent
Andersson et al.

(10) Patent No.: US 11,175,756 B2
(45) Date of Patent: Nov. 16, 2021

(54) DETECTING A BRUSH OBJECT WITH A TOUCH SENSING APPARATUS

(71) Applicant: FlatFrog Laboratories AB, Lund (SE)

(72) Inventors: David Andersson, Malmö (SE);
Kristofer Jacobson, Malmö (SE);
Tomas Christiansson, Torna-Hallestad (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

(21) Appl. No.: 16/981,227

(22) PCT Filed: Mar. 6, 2019

(86) PCT No.: PCT/SE2019/050195
§ 371 (c)(1),
(2) Date: Sep. 15, 2020

(87) PCT Pub. No.: WO2019/177515
PCT Pub. Date: Sep. 19, 2019

(65) Prior Publication Data
US 2021/0026466 A1    Jan. 28, 2021

(30) Foreign Application Priority Data
Mar. 16, 2018  (SE) .................................. 1830086-3

(51) Int. Cl.
*G06F 3/0354* (2013.01)
*G06F 3/041* (2006.01)

(52) U.S. Cl.
CPC ........ *G06F 3/03545* (2013.01); *G06F 3/0414* (2013.01)

(58) Field of Classification Search
CPC ....... G06F 3/041–04886; G06F 3/0414; G06F 3/03545; G06F 3/042–0423;
(Continued)

(56) References Cited

U.S. PATENT DOCUMENTS 5,155,813 A * 10/1992 Donoghue .......... G06F 3/04845
345/179
2002/0085003 A1 * 7/2002 Nagashima ........... G06T 11/001
345/441

(Continued)

FOREIGN PATENT DOCUMENTS

WO    WO 01/71654     9/2001
WO    WO 2017/026821  2/2017

OTHER PUBLICATIONS

International Search Report for International App. No. PCT/SE2019/050195, dated Jun. 11, 2019, in 4 pages.

*Primary Examiner* — Temesghen Ghebretinsae
*Assistant Examiner* — Ivelisse Martinez Quiles
(74) *Attorney, Agent, or Firm* — Knobbe Martens Olson & Bear, LLP

(57) ABSTRACT

A touch sensing apparatus is disclosed comprising a touch surface, and a touch sensor configured to determine a first set of coordinates on the touch surface of an object in contact with the touch surface. The touch sensing apparatus is configured to determine a virtual brush angle associated with the object, determine a movement of the object to a second set of coordinates determine an updated virtual brush angle for the object in dependence on a position of the second set of coordinates relative to the first set of coordinates, and output the second set of coordinates and the updated virtual brush angle. An associated method is also disclosed.

18 Claims, 8 Drawing Sheets

(58) Field of Classification Search
CPC ............... G06F 3/04883; G06F 3/0354; G06F 2203/04105; G06T 11/203; G06T 11/20
See application file for complete search history.

(56) References Cited

U.S. PATENT DOCUMENTS

| | | | |
|---|---|---|---|
| 2011/0199297 A1* | 8/2011 | Antonyuk | G06F 3/04883 345/157 |
| 2013/0120324 A1 | 5/2013 | Diverdi et al. | |
| 2014/0292690 A1 | 10/2014 | Sugihara | |
| 2015/0160851 A1 | 6/2015 | Michihata et al. | |
| 2016/0231833 A1 | 8/2016 | Gu et al. | |
| 2019/0012027 A1* | 1/2019 | Park | G06F 3/0416 |

* cited by examiner

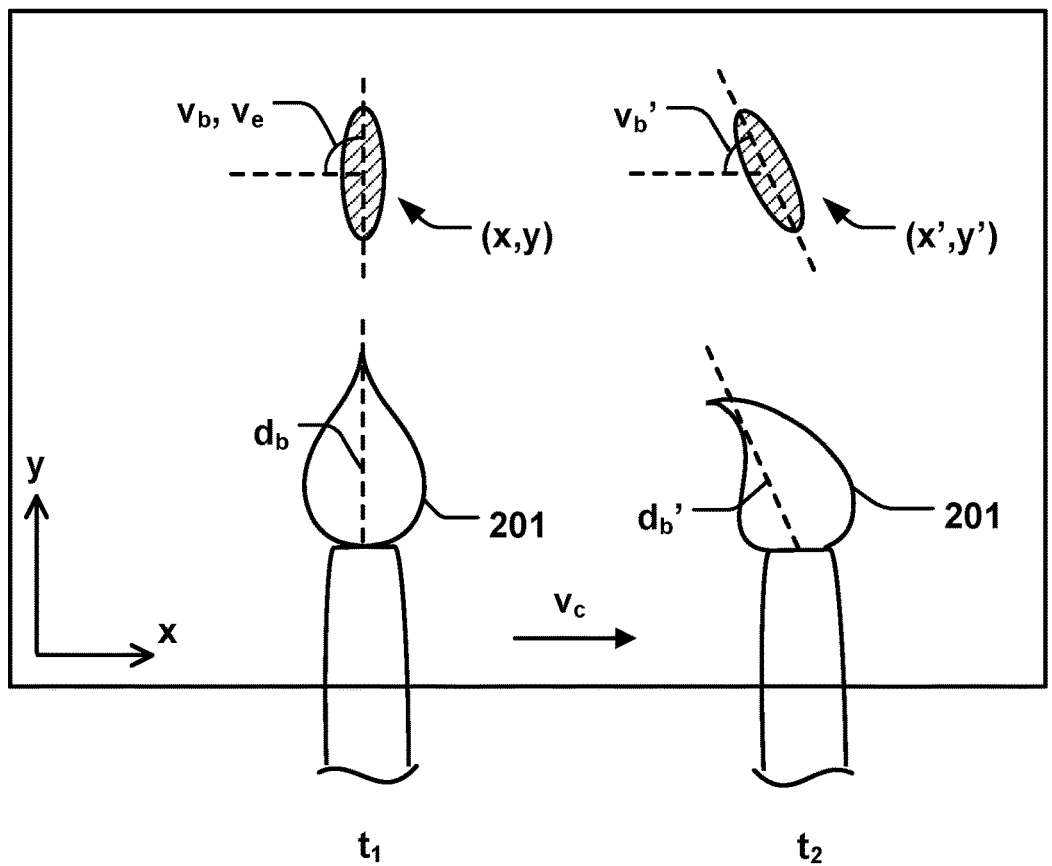
Fig. 2
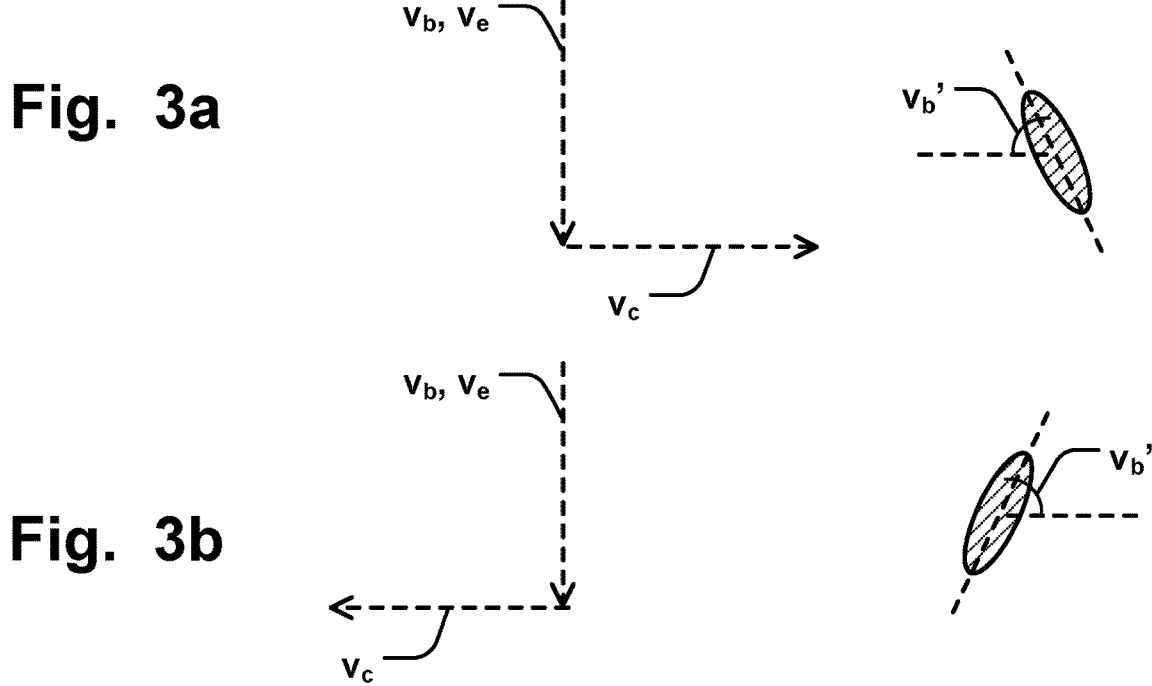
Fig. 3a
Fig. 3b

DETECTING A BRUSH OBJECT WITH A TOUCH SENSING APPARATUS

TECHNICAL FIELD

The present invention relates generally to the field of touch-based interaction systems. More particularly, the present invention relates to techniques of modelling touch response of an object such as a paint brush in a touch-sensing apparatus.

BACKGROUND

In various touch-based systems it is desirable to achieve a realistic response not only for various styluses having defined dimensions but also for more complex touch input objects such as common paint brushes with flexible straws. The flexibility of a straws translates into a complex dynamic of the brush when interacting with a surface, depending on various factors such as the directionality of the brush, the amount of pressure applied and the friction of the surface. A user may take advantage of this complexity to produce artistic results, such as in Chinese calligraphy, so far at least on traditional canvases of paper. Attempts to produce a realistic calligraphy experience in previous touch-based input systems are associated with insufficient accuracy and dynamics of the touch input from a brush. It is thus desirable to improve these factors so that the user is not held back artistically. Previous techniques may also rely on active input devices, e.g. brushes having sensors throughout the volume of the brush straws. This increases the complexity and limits the user's choices of brushes. This may accordingly hinder the development towards more feasible but highly customizable and intuitive touch systems.

Hence, an improved touch-sensitive apparatus and techniques of modelling touch response of an object such as a paint brush in a touch system would be advantageous.

It is an objective of the invention to at least partly overcome one or more of the above-identified limitations of the prior art.

One objective is to provide a touch sensitive apparatus in which the modelling of the dynamic behavior of a paint brush is improved.

Another objective is to provide a touch sensitive apparatus in which a realistic calligraphy experience can be provided.

One or more of these objectives, and other objectives that may appear from the description below, are at least partly achieved by means of a touch sensitive apparatus, system and a related method according to the independent claims, embodiments thereof being defined by the dependent claims.

According to a first aspect a touch sensing apparatus is provided comprising a touch surface, and a touch sensor configured to determine a first set of coordinates on the touch surface of an object in contact with the touch surface. The touch sensing apparatus is configured to determine a virtual brush angle associated with the object, determine a movement of the object to a second set of coordinates determine an updated virtual brush angle for the object in dependence on a position of the second set of coordinates relative to the first set of coordinates, and output the second set of coordinates and the updated virtual brush angle. An associated method is also disclosed.

According to a second aspect a method of modelling touch output of an object in a touch sensing apparatus comprising a touch surface is provided. The method comprises determining a first set of coordinates on the touch surface of the object in contact with the touch surface, determining a virtual brush angle associated with the object, determining a movement of the object to a second set of coordinates, determining an updated virtual brush angle for the object in dependence on a position of the second set of coordinates relative to the first set of coordinates, and outputting the second set of coordinates and the updated virtual brush angle.

According to a third aspect a computer program product is provided comprising instructions which, when the program is executed by a computer, cause the computer to carry out the steps of the method according to the second aspect.

Further examples of the invention are defined in the dependent claims, wherein features for the second and subsequent aspects of the disclosure are as for the first aspect mutatis mutandis.

Some examples of the disclosure provide for a touch sensitive apparatus in which the modelling of the dynamic behavior of a paint brush is improved.

Some examples of the disclosure provide for a touch sensitive apparatus in which a realistic calligraphy experience can be provided.

Some examples of the disclosure provide for improving the touch input from a passive brush.

Some examples of the disclosure provide for more accurately determine the directionality of a brush.

Some examples of the disclosure provide for producing a more accurate brush-like shape.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying schematic drawings, in which;

FIG. 2 show a brush moving between two sets of coordinates on a touch surface of a touch sensitive apparatus and associated virtual representations of the brush with different virtual brush angles, according to examples of the disclosure;

FIGS. 3a-b show the directions of the virtual brush angle and a current angle in which the brush moves, and associated output of an updated virtual brush angle, according to examples of the disclosure;

DETAILED DESCRIPTION

Figure 1A:
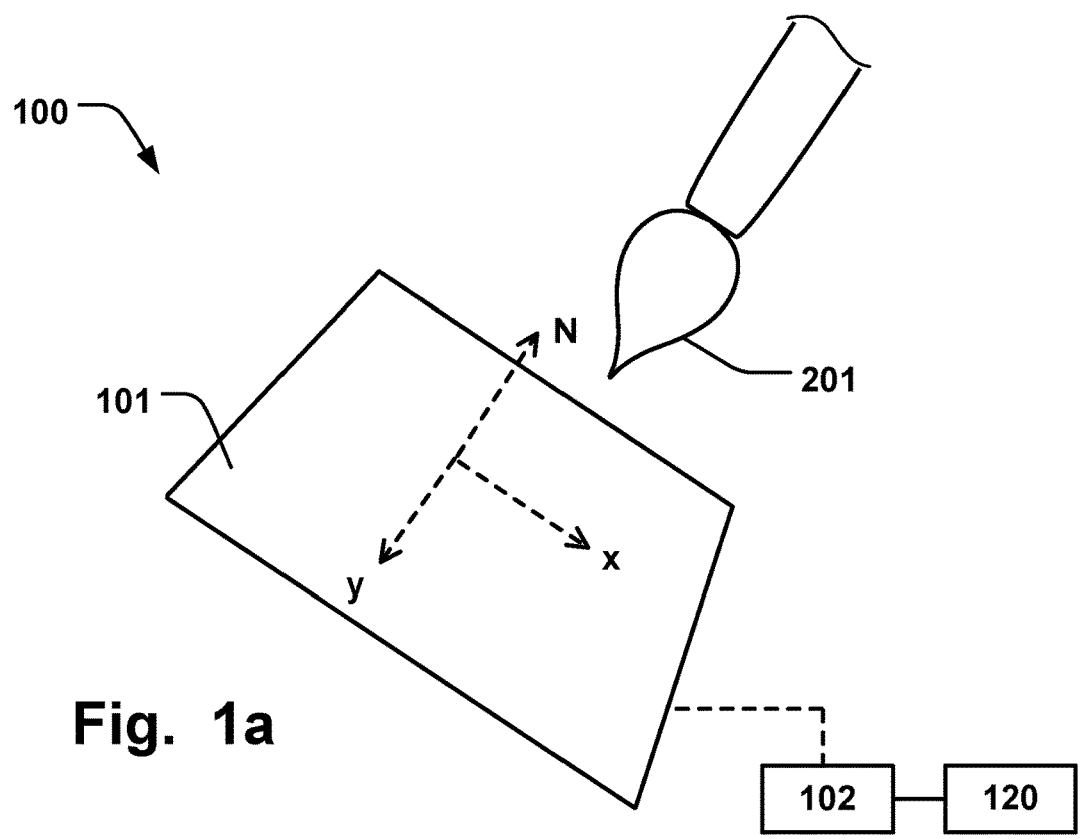
FIG. 1a show a touch sensitive apparatus with a brush as an input device, in a schematic perspective view, according to examples of the disclosure.

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

FIG. 1 is a schematic illustration of a touch-sensing apparatus 100 comprising a touch surface 101 configured to receive touch input, and a touch sensor 102 configured to determine surface coordinates (x, y; x', y'; x", y") of a touch input on the touch($v_e$), surface 101. The touch sensor 102 comprises a processor 120 and/or communicates with a processor 120 and may detect the surface coordinates of touch input based on different techniques. E.g. the touch sensor 102 may comprise capacitive sensor, such as for a projected touch screen, or an optical sensor. In the latter case, the touch sensor 102 may be configured to determine a surface coordinate (x, y) of a touch input, provided by an object, such as a brush having a bundle of flexible bristles, in contact with, or at least adjacent, the touch surface 101 from a position of an attenuation of light beams emitted along the touch surface 101. A plurality of optical emitters and optical receivers (not shown) may be arranged around the periphery of the touch surface 101 to create a grid of intersecting light paths across the touch surface 101 (otherwise known as detection lines or scanlines). Each light path extends between a respective emitter/receiver pair. An object 201 that touches the touch surface 101 will block or attenuate some of these light paths. Based on the identity of the receivers detecting a blocked light path, the location of the intercept between the blocked light paths can be determined. The position of touch input can thus be determined with high accuracy. The optical emitters and receivers may be arranged so that the grid of intersecting light paths extend above the touch surface 101. The light between the emitters and receivers may also propagate partly inside a light transmissive panel having the touch surface 101, via total internal reflection (TIR). When an object touches the surface, it frustrates the TIR thereby causing an attenuation of the light.

Figure 1B:
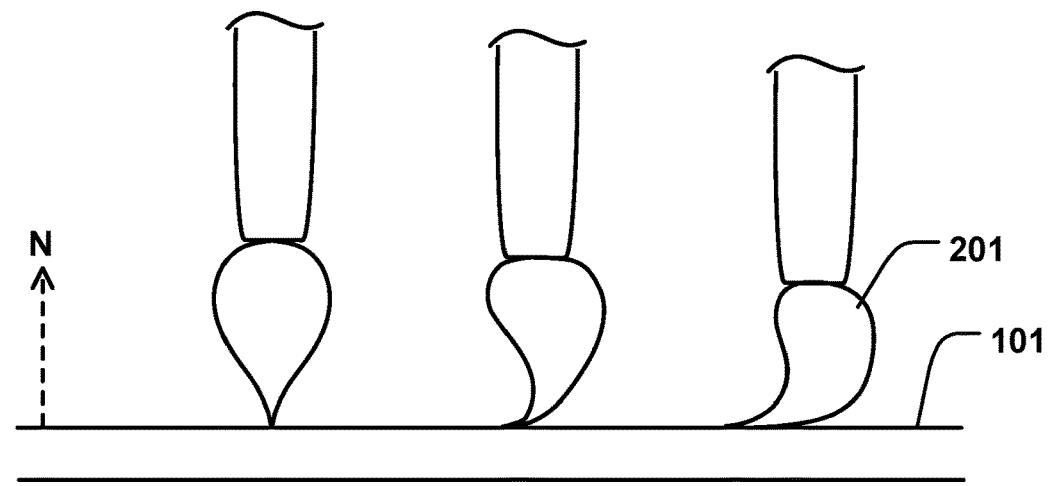
FIG. 1b show a brush applied with an increasing amount of pressure to a touch surface of a touch sensitive apparatus, in a schematic side view, according to examples of the disclosure.

FIG. 1b is a schematic illustration of a brush 201 having a flexible tip being deformed to various degrees when pressed against the touch surface 101. The size of the portion of the brush 201 contacting the touch surface 101 increases with the force by which the brush 201 is pressed against the touch surface 101. This is discussed in more detail with reference to FIGS. 6a and 8. Due to its flexibility, the brush 201 will deflect in various directions as the user moves it across the touch surface 101. The brush 201 may have a bundle of thin flexible bristles, or any other flexible structure at its tip, such as a foam-like or rubber-like material, or any other material that advantageously provides for a flexible or resilient contact with the touch surface 101. The brush 201 may be round and pointed, as typically used in brush drawings or in calligraphy. It may also have other shapes such as oval or flat. The touch response of an object 201 having such properties can be accurately modelled with touch-sensing apparatus 100 and method 300 as described below.

The touch sensor 102 is configured to determine 301 a first set of coordinates (x, y) on the touch surface 101 of an object 201, such as the above discussed brush 201, in contact with the touch surface 101. The touch-sensing apparatus 100, or associated processor 120, is configured to determine 302 a virtual brush angle ($v_b$) associated with the object 201. FIG. 2 is a schematic illustration showing a first position, at time $t_1$, of object 201 on the touch surface 101, and associated first coordinates (x, y) determined for the first position. The first coordinates (x, y) may be output to a display unit (not shown) which may overlay the touch surface 101 and be arranged underneath the same. The display unit may hence be configured to display a virtual representation of the object 201 at the determined first set of coordinates (x, y). FIG. 2 show such virtual representation of the object 201 (in the figure vertically above the object 201 for a clearer presentation). The touch-sensing apparatus 100 may be configured to determine the shape, size, angle, and other associated properties of the object 201 contacting the touch surface 101 based on the attenuation values of the above-mentioned grid of detection lines across the touch surface 101.

The touch-sensing apparatus 100 is configured to determine 303 a movement of the object 201 to a second set of coordinates (x', y'; x", y"). FIG. 2 shows the object 201 at a second set of coordinates (x', y') at time $t_2$. The touch-sensing apparatus 100 is configured to determine 304 an updated virtual brush angle ($v_b'$, $v_b''$) for the object 201 in dependence on a position of the second set of coordinates (x', y'; x", y") relative to the first set of coordinates (x, y). Thus, as the object 201 moves to (x', y') in FIG. 2, the previously determined virtual brush angle ($v_b$) at (x, y), is changed based on the location of (x', y') relative (x, y), and the virtual representation of the brush at (x', y') is displayed with the updated virtual brush angle ($v_b'$). The touch-sensing apparatus 100 is thus configured to output 305 the updated virtual brush angle ($v_b'$) and the second coordinates (x',y'), and a display unit may be configured to display a virtual representation of the brush at (x', y') with the updated virtual brush angle ($v_b'$). The processor 120 may be configured to carry out the steps 301-305 as described above. The processor 120 may be configured to communicate with a secondary, external or remote processing unit (not shown) configured to perform calculations associated with steps 301-305 in response to respective control instructions of processor 120. The method 300 described in relation to FIG. 9 may comprise carrying out steps 301-305 with the processor 120, or alternatively with the mentioned external or remote processing unit.

In the example of FIG. 2, the brush 201 is aligned in a vertical direction at (x, y), before being moved horizontally to the right to (x', y') in the figure. The direction of movement, represented by a current angle ($v_c$), is compared to the virtual brush angle ($v_b$) at (x, y). The virtual brush angle ($v_b$) may be variably adjusted in dependence of the current angle ($v_c$), in order to mimic the behavior of a brush 201 on a traditional paper canvas. E.g. the friction between a brush 201 and a paper canvas will typically result in a more pronounced deflection of the bristles of the brush 201 when the brush 201 is moved in directions perpendicular to the direction in which the bristles extend, as the friction will act in a direction perpendicular to the flexible bristles. Movement of the brush 201 in directions substantially parallel to the direction in which the brush 201 extends will typically result in less deflection as the frictional force act along the direction of the bristles. It is thus possible to mimic the dynamic behavior of the brush 201 on a traditional canvas by determining the current angle ($v_c$), i.e. the position of the second set of coordinates (x', y') relative to the first set of coordinates (x, y), as the object 201 moves from $t_1$ to $t_2$ and modify the virtual brush angle ($v_b$) in dependence on the current angle ($v_c$). A more realistic modelling of the brush 201 may thus be provided when used on a touch surface 101. The friction between the touch surface 101 and a brush 201 may thus be kept low, i.e. compared to using paint on a paper canvas, while still being able to recreate the effects of friction on the brush 201 in the touch response. A traditional brush 201 may thus provide advanced touch input where the directionality and brush dynamics is utilized in advanced artistic expressions, such as Chinese calligraphy. As the virtual brush angle ($v_b$) at $t_1$ and the current angle ($v_c$) can be determined from sensor data, based on e.g. the attenuation of the intersecting light paths as discussed above, and the virtual brush angle ($v_b$) being updated based on ($v_c$), it is not necessary to incorporate complex detection methods of the actual directionality of the brush 201 as it moves along the touch surface 101. Hence, it is not necessary to use e.g. an "active" brush with multiple sensors tracking the dynamics of the brush. Even if the brush was tracked with such solution, it would not provide for a realistic modelling as described above due to the low friction between the brush and the touch surface 101. The brush 201 used with the touch-sensing apparatus 100 may thus be a "passive" brush without sensors.

FIGS. 3a-b are further examples of how the updated virtual brush angle ($v_b'$) varies in dependence on the current angle ($v_c$). FIG. 3a corresponds to the example in FIG. 2, where the brush 201 moves to horizontally the right, between (x,y) and (x',y'), relative the virtual brush angle ($v_b$) at (x,y), so that the updated virtual brush angle ($v_b'$) at (x',y') result in a counter-clockwise tilt of the virtual representation of the brush 201. The brush 201 is moved horizontally to the left in FIG. 3b, relative ($v_b$), resulting in a clockwise tilt of the virtual representation of the brush 201, to mimic the behavior of deflecting bristles of the brush 201 in the opposite direction due to surface friction.

Figure 4A:
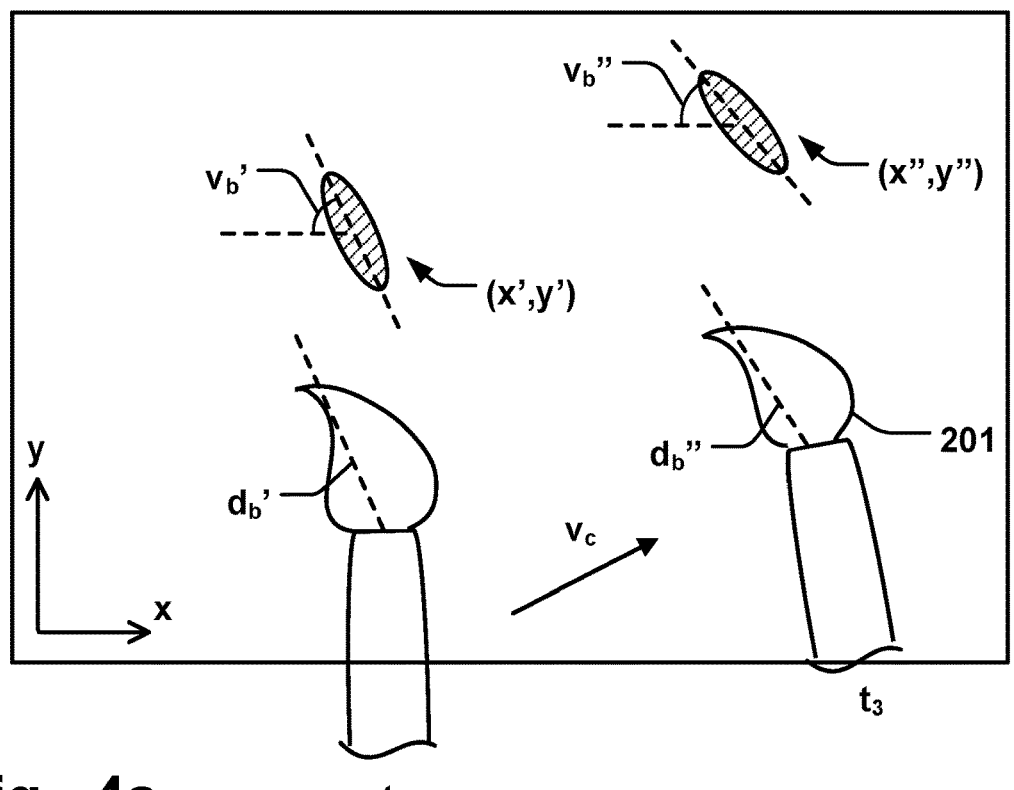
FIG. 4a show a brush moving between two sets of coordinates on a touch surface of a touch sensitive apparatus and associated virtual representations of the brush with different virtual brush angles, according to examples of the disclosure.
Figure 4B:
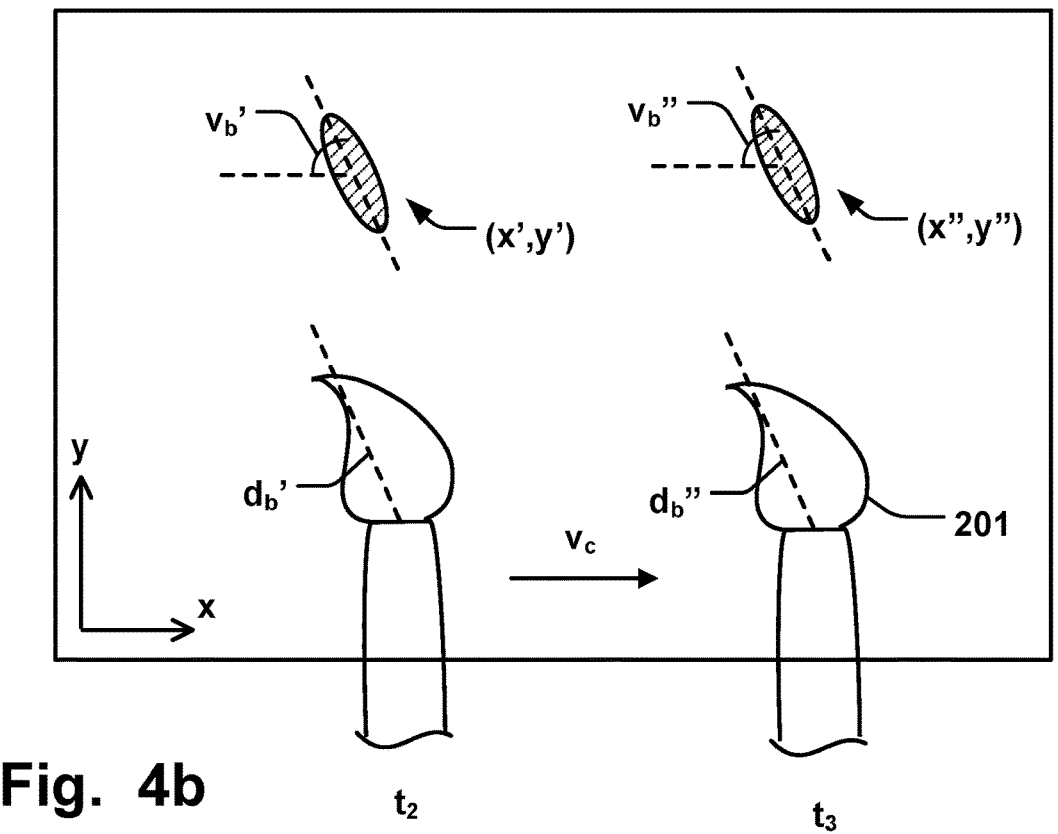
FIG. 4b show a brush moving between two sets of coordinates on a touch surface of a touch sensitive apparatus and associated virtual representations of the brush with different virtual brush angles, according to examples of the disclosure.

FIGS. 4a-b are further examples of continued movement of the brush 201 on the touch surface 101, and the resulting virtual deflection thereof. In FIG. 4a the brush moves from (x',y') to (x",y") with current angle ($v_c$) near perpendicular to virtual brush angle ($v_b'$) previously determined at (x',y'). The updated virtual brush angle ($v_b''$) at new position (x", y") is determined based on the directionality of the current angle ($v_c$). In this case, the updated virtual brush angle ($v_b''$) is determined so that the virtual representation of the brush 201 is deflected further to the left at (x', y") relative (x',y'). The virtual brush angle ($v_b$) may thus be continuously updated in dependence on the current angle ($v_c$) as the brush 201 moves across the touch surface. In FIG. 4b the brush 201 continues to move to the right substantially horizontally from $t_2$ to $t_3$, as the brush moved from $t_1$ to $t_2$ in FIG. 2. The deflection of the brush 201 is less than in FIG. 4a and may also maintain the same virtual brush angle as in the position at $t_2$. E.g. it is conceivable that when the brush 201 is moved along a constant angle ($v_c$) that the frictional force can be momentaneous equal to the counter force provided by the flexible brush so that the deflection and the virtual brush angle ($v_b$) is determined to be constant.

The touch-sensing apparatus 100 may be configured to determine a brush direction ($d_b$, $d_b'$, $d_b''$) along which the object 201 extends on the touch surface 201. As the object 201 moves to the second set of coordinates (x',y';x",y"), the touch-sensing apparatus 100 may be configured to determine an associated direction of movement having a current angle ($v_c$) relative to the brush direction ($d_b$, $d_b'$, $d_b''$). The brush direction ($d_b$, $d_b'$, $d_b''$) has an associated virtual brush angle ($v_b$, $v_b'$, $v_b''$), which in one example correspond substantially to the brush direction ($d_b$, $d_b'$, $d_b''$). However, as discussed above, the virtual brush angle ($v_b$, $v_b'$, $v_b''$) can be continuously updated based on the directionality of the current angle ($v_c$) so that the virtual representation of the brush 201 mimics the deflection the brush 201 would have on traditional paper, rather than the actual deflection the brush 201 has on the touch surface 102. Thus, the virtual brush angle ($v_b$, $v_b'$, $v_b''$) may have a momentaneous angular off-set from the brush direction ($d_b$, $d_b'$, $d_b''$). The touch-sensing apparatus 100 may be configured to determine the updated virtual brush angle ($v_b'$, $v_b''$) of the object 201, as the object 201 moves to the second set of coordinates (x',y'; x",y"), by adding an angle compensation value to the virtual brush angle ($v_b$) associated with the brush direction ($d_b$), where the angle compensation value is based on the current angle ($v_c$). Thus, the direction of the current angle ($v_b$) relative to brush direction ($d_b$) may be taken into account for updating the virtual brush angle ($v_b'$, $v_b''$). The angle compensation value, controlling how much the virtual brush angle is changed, is varied depending on the current angle ($v_c$), as discussed in more detail in relation to FIG. 5.

The touch-sensing apparatus 100 may be configured to determine the virtual brush angle ($v_b$) as an entry angle ($v_e$) of a brush direction ($d_b$) along which the object 201 extends on the touch surface 101 at a first set of coordinates (x,y). For example, as the brush 201 touches the touch surface 101 at (x,y), the brush direction ($d_b$) has an entry angle ($v_e$) on the touch surface 101 that can be regarded as the current virtual brush angle ($v_b$), which is subsequently updated as described above when the brush 201 moves to the second set of coordinates (x',y'). As the current angle ($v_c$) has a relationship to the entry angle ($v_e$), the angle compensation value may be regarded as being based on at least the current angle ($v_c$), i.e. also being based on the entry angle ($v_e$).

Figure 6A:
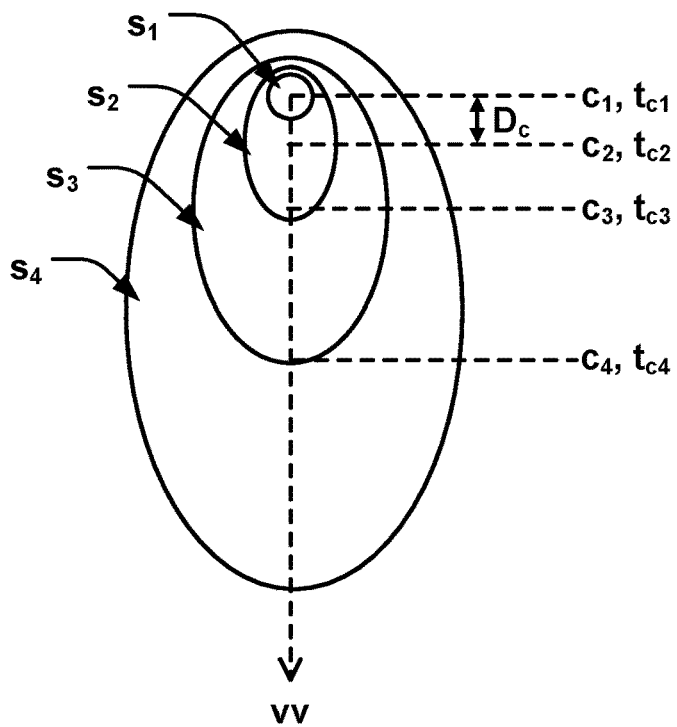
FIG. 6a show a gradual increase in the pressure by which a brush is pressed against a touch surface and the associated increase in cross-section of the part of the brush in contact with the touch surface, and a velocity vector determined according to examples of the disclosure.

The touch-sensing apparatus 100 may be configured to determine the entry angle ($v_e$) by determining a first shape ($s_1$) of a portion 204 of the object 201 in contact with the touch surface 101, and determining a subsequent second shape ($s_2$, $s_3$, $s_4$) of a portion 204 of the object 201 in contact with the touch surface 101, as the object 201 is pushed against the touch surface 101. FIG. 6a is a schematic illustration showing a gradual increase in the pressure by which the brush 201 is pressed against the touch surface 101 and the associated increase in cross-section of the part 204 (see also FIG. 7b) of the brush 201 in contact with the touch surface 101. The touch-sensing apparatus 100 may be configured to determining respective center point coordinates ($c_1$, $c_2$, $c_3$, $c_4$) of the first ($s_1$) and second shapes ($s_2$, $s_3$, $s_4$), and determine the entry angle ($v_e$) based on the center point coordinates ($c_1$, $c_2$, $c_3$, $c_4$). Thus, as the shape or cross-section of part 204 of the brush 201 in contact with the touch surface 101 changes with the increased pressure, the entry angle ($v_e$) can be determined based on the associated shift of respective center point coordinates ($c_1$, $c_2$, $c_3$, $c_4$).

The touch-sensing apparatus 100 may be configured to determine a velocity vector (vv) of the object 201 based on a registration time ($t_{c1}$, $t_{c2}$, $t_{c3}$, $t_{c4}$) of the center point coordinates ($c_1$, $c_2$, $c_3$, $c_4$) and a distance ($D_c$) therebetween, as schematically illustrated in FIG. 6a. The entry angle ($v_e$) may then be determined based on the velocity vector (vv). The entry angle ($v_e$) may thus be determined in a facilitated manner. It is also conceivable that the brush direction ($d_b$, $d_b'$, $d_b''$) may be determined at any time by determining the shift in center point coordinates ($c_1$, $c_2$, $c_3$, $c_4$) as the pressure of the brush 201 varies.

Figure 6B:
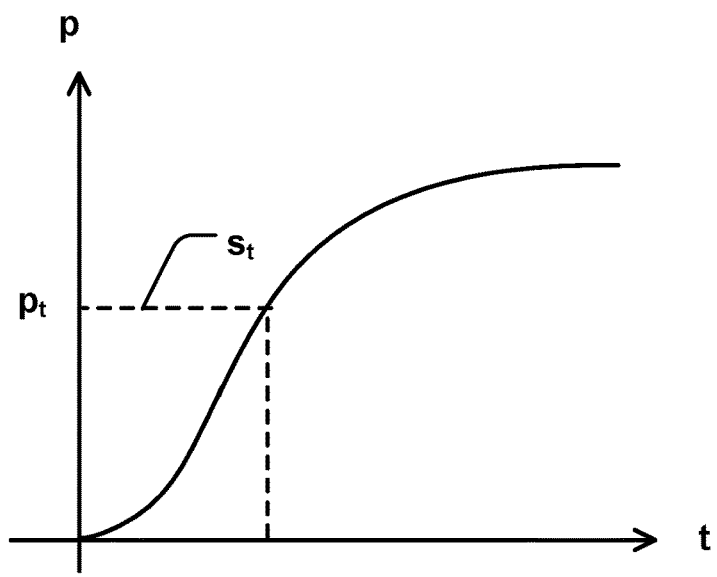
FIG. 6b show the variation in pressure over time as the brush is pressed against the touch surface, proportional to the size of cross-section determined in FIG. 6a, according to examples of the disclosure.

The touch-sensing apparatus 100 may be configured to determine the entry angle ($v_e$) of the object 201 upon a first contact thereof with the touch surface 101 at the first set of coordinates (x,y), and determine a variation in the shape over time upon said first contact. FIG. 6b is a schematic illustration of an increasing pressure over time, at the first contact, which is proportional to the size of the portion 204 in contact with the touch surface 101. The touch-sensing apparatus 100 may be configured to define a threshold value ($s_t$) of a size of the object associated with the shape at which time the entry angle ($v_e$) is determined. The threshold value of the size ($s_t$) has a corresponding pressure threshold ($p_t$). By taking into account such thresholds it is possible to get a more reliable read of the velocity vector (vv) and the entry angle ($v_e$). An estimate of the pressure can be determined from the varying size of the object, and it is not necessary to determine a pressure value as such. For example, one method to estimate the pressure by which an object 201 is being pressed against the touch surface 101 is by detecting an increased object attenuation resulting from the object being pressed and deformed against the surface to cover a larger portion of the touch surface. It is also conceivable that the touch-sensing apparatus 100 may be configured to detect the pressure by which an object 201 is being pressed against the touch surface 101, and from the determined pressure values estimate the size of a portion of the object 201 in contact with the touch surface 101 at different times.

Figure 5:
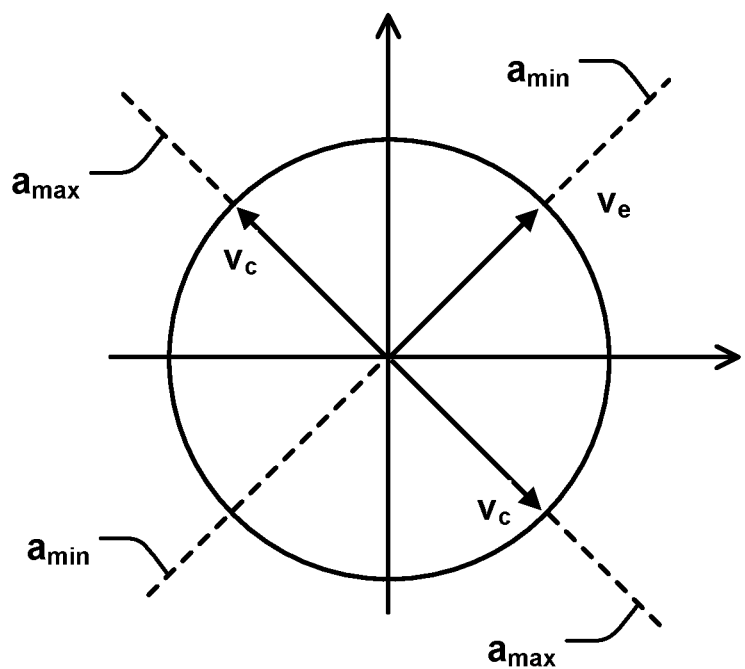
FIG. 5 show the directions of an entry angle of the brush relative a current angle in which the brush moves, and associated maximum and minimum angle compensations values to update the virtual brush angle of the brush, according to examples of the disclosure.

The touch-sensing apparatus 100 may be configured to add a defined maximum value ($a_{max}$) of the angle compensation value to the entry angle ($v_e$) when the current angle ($v_c$) is determined as being perpendicular to the entry angle ($v_e$). FIG. 5 show the directions of an entry angle ($v_e$) of the brush 201 relative a current angle ($v_c$) in which the brush 201 moves, and associated maximum and minimum angle compensations values ($a_{max}$, $a_{min}$) to update the virtual brush angle ($v_b$) of the brush 201.

Thus, the touch-sensing apparatus 100 may be configured to add a defined minimum value ($a_{min}$) of the angle compensation value to the entry angle ($v_e$) when the current angle ($v_c$) is determined as being parallel to the entry angle ($v_e$). The angle compensation values may vary in a range between the mentioned minimum and maximum values in dependence on the current angle ($v_c$) relative the entry angle ($v_e$). Although reference is made to the entry angle ($v_e$) in this example, it is conceivable, that the virtual brush angle ($v_b$) is updated as described with the angle compensation value at any point in time as the brush 201 moves across the touch surface 101.

The touch-sensing apparatus 100 may be configured to maintain output of the updated virtual brush angle ($v_b'$) while the object 201 moves with a defined current angle ($v_c$) value on the touch surface 101. For example, as described in relation to FIG. 4b, if the object 201 moves with a constant current angle ($v_c$), the output may also be a constant virtual angle ($v_b'$), to mimic a situation where the sum of the forces acting on a brush is in equilibrium, to e.g. produce a brush stroke of substantially constant width. The touch-sensing apparatus 100 may also be configured to update the virtual brush angle ($v_b$) in dependence of the speed and acceleration of the object moving between (x,y) and (x',y'). E.g. a slow movement may be modelled as providing less deflection of the brush 201 compared to a quick movement.

The touch-sensing apparatus 100 may be configured to continuously compensate the updated virtual brush angle ($v_b'$) by adding the angle compensation value to the updated virtual brush angle ($v_b'$) based on variations in the current angle value ($v_c$). Hence, as also described in relation to FIG. 4a, the updated virtual brush angle ($v_b'$) may be continuously adjusted in dependence on ($v_c$).

Figure 8:
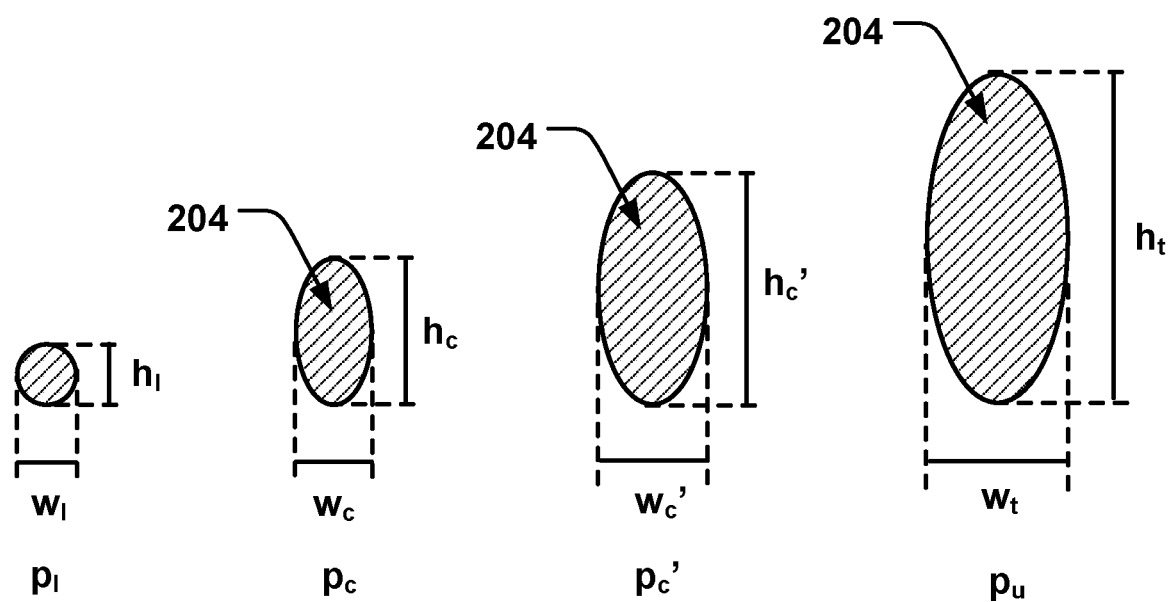
FIG. 8 show a gradual increase in the size of a modelled portion of the brush in contact with the touch surface with increased pressure, according to examples of the disclosure.

The touch-sensing apparatus 100 may be configured to determine width ($w_c$) and height ($h_c$) coordinates or dimensions of a portion 204 of the object 201 in contact with the touch surface 101 by defining width and height limits ($w_t$, $h_t$) for the object 201 for an upper reference pressure ($p_u$) of the object 201 being pushed against the touch surface 101, where the width and height dimensions are then determined as fractions of the respective width and height limits ($w_t$, $h_t$) in dependence on a current pressure ($p_c$). FIG. 8 show a gradual increase in the size of a virtual representation of a portion 204 of the object 201 in contact with the touch surface 101 with increased pressure. The maximum width ($w_t$) may be considered as proportional to the number and thickness of the bristles of a brush 201, and the maximum height ($h_t$) to be proportional to the length of the brush 201. By determining the width and height coordinates ($w_c$, $h_c$) as fractions of the respective width and height limits ($w_t$, $h_t$) in dependence on a current pressure ($p_c$), it is possible to model a brush where the width and height expands with different rates, which is typically the case in some applications such as when using a wet brush in Chinese calligraphy.

The touch-sensing apparatus 100 may be configured to determine the width coordinates ($w_l$) as being equal to the height coordinates ($h_l$) below a defined lower reference pressure ($p_l$), to enable thin/light strokes. The model can be adjusted in dependence on the type of brush 201 that is used.

Figure 7A:
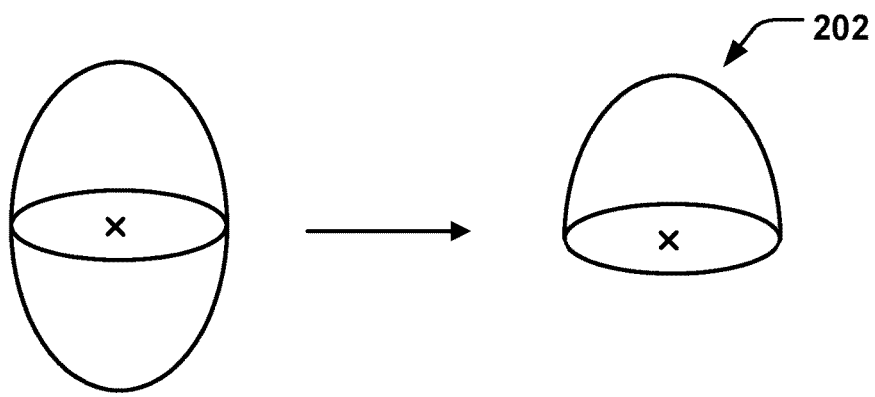
FIG. 7a show the schematic modelling of a brush as an elliptic shape, according to examples of the disclosure.

The touch-sensing apparatus may be configured to model the object 201 as an elliptic-shaped brush 202, as schematically illustrated in FIG. 7a where half the ellipse divided through its mass-center may be modelled as the bottom of the brush 201. This may facilitate optimizing the touch response so that e.g. brush strokes with sharp edges and corners may be realized.

Figure 7B:
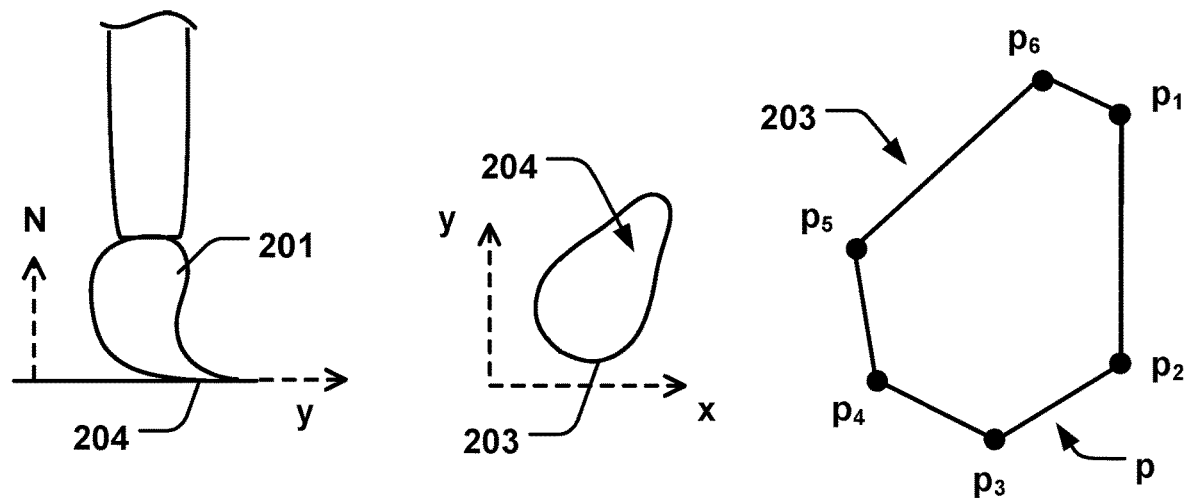
FIG. 7b schematically shows the modelling of a portion of the brush in contact with the touch surface as a polygon model, according to examples of the disclosure.

The touch-sensing apparatus 100 may be configured to model an outline 203 of a portion 204 of the object 201 in contact with the touch surface 101 as a polygon (p) with spline smoothening. FIG. 7b show one example of a polygon (p) representing a portion 204 of the object 201 in contact with the touch surface 101. The edges of the polygon (p) can be rendered smoothly using a spline with the polygon points (p1-p6) used as control points. This provides for further improving the modelling of the brush 201 to achieve a realistic virtual representation.

Figure 7C:
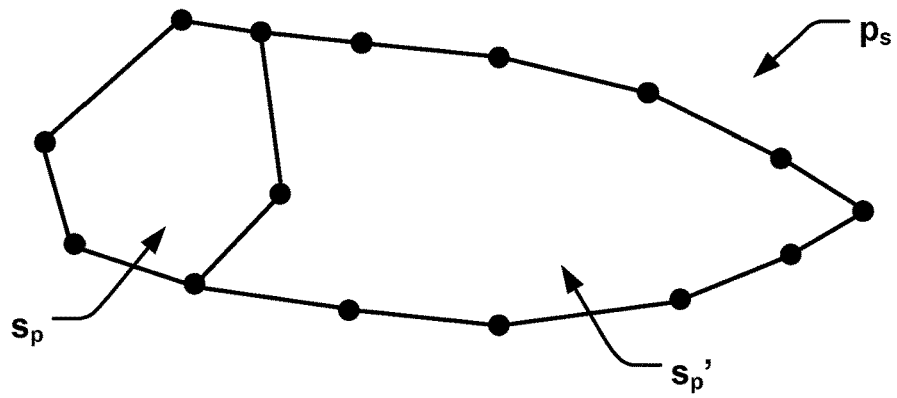
FIG. 7c schematically shows the modelling of a brush stroke of the brush on the touch surface as a polygon model, according to examples of the disclosure.

The touch-sensing apparatus 100 may be configured to determine a shape ($s_p$, $s_p'$) of the polygon of the portion 204 in contact with the touch surface 101 for a series of subsequent frames of the object 201 detected by the touch sensor 102. Thus, the polygon (p) may be continuously updated to approximate the shape of the portion 204 in contact with the touch surface 101. FIG. 7c shows an example where the polygon assumes to different shapes ($s_p$, $s_p'$) at different points in time. Determining the shape of the polygon may comprise applying the updated virtual brush angle ($v_p'$) to the outline 203. The directionality of the polygon may hence be determined by aligning the outline 203 in accordance with the virtual brush angle ($v_b'$) to provide for an accurate modeling of the dynamic behavior of a brush 201 on the touch surface 101. The touch-sensing apparatus 100 may be configured to combine a plurality of polygons determined for each frame as a brush stroke model polygon ($p_s$). FIG. 7c shows an example where polygons ($s_p$, $s_p'$) together form a brush stroke polygon ($p_s$).

Figure 9:
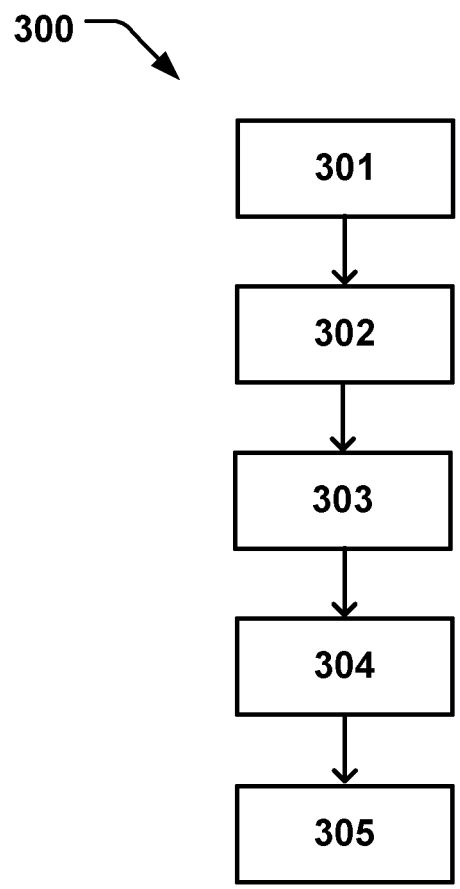
FIG. 9 is a flowchart of a method of modelling touch output of an object in a touch sensing apparatus, according to examples of the disclosure.

FIG. 9 illustrates a flow chart of a method of modelling touch output of an object 201 in a touch sensing apparatus 100. The touch sensing apparatus 100 comprises a touch surface 101. The order in which the steps of the method 300 are described and illustrated should not be construed as limiting and it is conceivable that the steps can be performed in varying order. The method 300 comprises determining 301 a first set of coordinates (x, y) on the touch surface 101 of the object 201 in contact with the touch surface 101, determining 302 a virtual brush angle ($v_b$) associated with the object 201, determining 303 a movement of the object 201 to a second set of coordinates (x', y'; x", y"), determining 304 an updated virtual brush angle ($v_b'$, $v_b''$) for the object 201 in dependence on a position of the second set of coordinates (x', y'; x", y") relative to the first set of coordinates (x,y), and outputting 305 the second set of coordinates (x', y'; x", y") and the updated virtual brush angle ($v_b'$, $v_b''$). The method 300 thus provides for the advantageous benefits as described above in relation to the touch-sensing apparatus 100 and FIGS. 1-8.

A computer program product is also provided comprising instructions which, when the program is executed by a computer, cause the computer to carry out the steps of the method 300 as described above.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A touch sensing apparatus, comprising:
   a touch surface, and
   a touch sensor comprising a set of optical emitters and optical receivers arranged around a periphery of the touch surface,
   the touch sensor being configured to determine a first set of coordinates on the touch surface of the touch sensing apparatus responsive to a brush object comprising bristles coming in contact with the touch surface, wherein a width of the brush object is perpendicular to the bristles,
   the touch sensing apparatus being configured to:
      determine a virtual brush angle associated with the brush object, generate a model of the brush object in dependence on the width of the brush object and the virtual brush angle, the model of the brush object being an ellipse positioned at the first set of coordinates having a width corresponding to the width of the brush object and an orientation corresponding to the virtual brush angle,
      determine a movement of the brush object to a second set of coordinates,
      determine an updated virtual brush angle for the brush object in dependence on a position of the second set of coordinates relative to the first set of coordinates, and
      update the model of the brush object in dependence on the second set of coordinates and the updated virtual brush angle.

2. The touch sensing apparatus according to claim 1, wherein the touch sensing apparatus is configured to
   determine a brush direction along which the brush object extends on the touch surface, and as the brush object moves to the second set of coordinates,
   determine an associated direction of movement having a current angle relative to the brush direction, and
   determine the updated virtual brush angle of the brush object, as the brush object moves to the second set of coordinates, by adding an angle compensation value to the virtual brush angle associated with the brush direction, wherein the angle compensation value is based at least on the current angle.

3. The touch sensing apparatus according to claim 2, wherein the touch sensing apparatus is configured to determine the virtual brush angle as an entry angle of a brush direction along which the brush object extends on the touch surface at the first set of coordinates.

4. The touch sensing apparatus according to claim 3, wherein the touch sensing apparatus is configured to determine the entry angle by;
   determining a first shape of a portion of the brush object in contact with the touch surface,
   determining a subsequent second shape of a portion of the brush object in contact with the touch surface, as the brush object is pushed against the touch surface,
   determining respective center point coordinates of the first and second shapes, and
   determining the entry angle based on the center point coordinates.

5. The touch sensing apparatus according to claim 4, wherein the touch sensing apparatus is configured to determine a velocity vector of the brush object based on a registration time of the center point coordinates and a distance therebetween, and determine the entry angle based on the velocity vector.

6. The touch sensing apparatus according to claim 4, wherein the touch sensing apparatus is configured to determine the entry angle of the brush object upon a first contact thereof with the touch surface at the first set of coordinates, determine a variation in a shape of the brush object over time upon said first contact, define a threshold value of a size of the brush object associated with the shape at which time the entry angle is determined.

7. The touch sensing apparatus according to claim 3, wherein the touch sensing apparatus is configured to add a defined maximum value of the angle compensation value to the entry angle when the current angle is determined as being perpendicular to the entry angle.

8. The touch sensing apparatus according to claim 3, wherein the touch sensing apparatus is configured to add a defined minimum value of the angle compensation value to the entry angle when the current angle is determined as being parallel to the entry angle.

9. The touch sensing apparatus according to claim 2, wherein the touch sensing apparatus is configured to maintain output of the updated virtual brush angle while the brush object moves with a defined current angle value on the touch surface.

10. The touch sensing apparatus according to claim 2, wherein the touch sensing apparatus is configured to continuously compensate the updated virtual brush angle by adding the angle compensation value to the updated virtual brush angle based on variations in the current angle.

11. The touch sensing apparatus according to claim 1, wherein the touch sensing apparatus is configured to determine width and height coordinates of a portion of the brush object in contact with the touch surface by defining width and height limits for the brush object for an upper reference pressure of the brush object pushed against the touch surface, whereby the width and height coordinates are determined as fractions of the respective width and height limits in dependence on a current pressure.

12. The touch sensing apparatus according to claim 11, wherein the touch sensing apparatus is configured to determine the width coordinates as being equal to the height coordinates below a defined lower reference pressure.

13. The touch sensing apparatus according to claim 1, wherein the touch sensing apparatus is configured to model an outline of a portion of the brush object in contact with the touch surface as a polygon with spline smoothening.

14. The touch sensing apparatus according to claim 13, wherein the touch sensing apparatus is configured to determine a shape of the polygon of the portion of the brush object in contact with the touch surface for a series of subsequent frames of the brush object detected by the touch sensor.

15. The touch sensing apparatus according to claim 14, wherein determining the shape of the polygon comprises applying the updated virtual brush angle to the outline of the portion of the brush object in contact with the touch surface.

16. The touch sensing apparatus according to claim 15, wherein the touch sensing apparatus is configured to combine a plurality of polygons determined for each frame as a brush stroke model polygon.

17. Method of modelling a brush object in a touch sensing apparatus comprising a touch surface and a touch sensor comprising a set of optical emitters and optical receivers arranged around a periphery of the touch surface and wherein the touch sensor is capable of measuring a position and width of an brush object in contact with the touch surface, wherein the brush object comprises bristles, the method comprising;

determining a first set of coordinates on the touch surface of the touch sensing apparatus responsive to the brush object coming in contact with the touch surface, wherein the width of the brush object is perpendicular to the bristles, determining a virtual brush angle associated with the brush object, generating a model of the brush object in dependence on the width of the brush object and the virtual brush angle, the model of the brush object being an ellipse positioned at the first set of coordinates having a width corresponding to the width of the brush object and an orientation corresponding to the virtual brush angle, determining a movement of the brush object to a second set of coordinates, determining an updated virtual brush angle for the brush object in dependence on a position of the second set of coordinates relative to the first set of coordinates, and updating the model of the brush object in dependence on the second set of coordinates and the updated virtual brush angle.

18. A non-transitory computer readable medium comprising instructions which, when executed by a computer, cause the computer to carry out the method according to claim 17.

* * * * *